United States Patent
Enomoto

(10) Patent No.: US 7,349,558 B2
(45) Date of Patent: Mar. 25, 2008

(54) IMAGE PROCESSING METHOD, IMAGE PROCESSING APPARATUS, STORAGE MEDIUM AND PROGRAM

(75) Inventor: Hiromichi Enomoto, Sagamihara (JP)

(73) Assignee: Konica Minolta Holdings, Inc. (JP)

( * ) Notice: Subject to any disclaimer, the term of this patent is extended or adjusted under 35 U.S.C. 154(b) by 779 days.

(21) Appl. No.: 10/777,294

(22) Filed: Feb. 12, 2004

(65) Prior Publication Data

US 2004/0161166 A1    Aug. 19, 2004

(30) Foreign Application Priority Data

Feb. 19, 2003    (JP) .............................. 2003-040843

(51) Int. Cl.
*G06K 9/00*    (2006.01)

(52) U.S. Cl. ...................... 382/118; 382/190; 382/296; 345/473; 348/169

(58) Field of Classification Search ................ 382/118, 382/141, 195, 243, 233, 285, 209, 190, 296; 375/240.16; 348/625, 699, 77, 169, 164, 348/E5.022; 250/214 VT; 356/5.04; 430/396, 430/5; 345/473

See application file for complete search history.

(56) References Cited

U.S. PATENT DOCUMENTS

| | | | | | |
|---|---|---|---|---|---|
| 5,835,616 | A | * | 11/1998 | Lobo et al. ................. | 382/118 |
| 6,741,756 | B1 | * | 5/2004 | Toyama et al. ............. | 382/291 |
| 6,965,693 | B1 | * | 11/2005 | Kondo et al. ............... | 382/190 |
| 7,120,279 | B2 | * | 10/2006 | Chen et al. ................. | 382/118 |
| 7,155,037 | B2 | * | 12/2006 | Nagai et al. ................ | 382/118 |
| 7,158,177 | B2 | * | 1/2007 | Kage et al. ................. | 348/239 |

FOREIGN PATENT DOCUMENTS

JP    8-138024    5/1996

* cited by examiner

*Primary Examiner*—Sheela Chawan
(74) *Attorney, Agent, or Firm*—Cantor Colburn LLP

(57) ABSTRACT

There is described image-processing methods, apparatus and programs, which make it possible to accurately determine an oriented direction of an image to be displayed as a single screen image, without requiring operator's assistances. The method includes the steps of: determining whether or not a personal image is included in the image, based on image signals representing the image; recognizing an oriented direction of the image, based on at least one of element-feature quantities with respect to constituent elements constituting the personal image, when determining that the personal image is included in the image in the determining step. The constituent elements include a shape of face, a positional relationship between both eyes, a positional relationship between the face and hair on a head, and a positional relationship between the face and a hand or a leg.

17 Claims, 6 Drawing Sheets

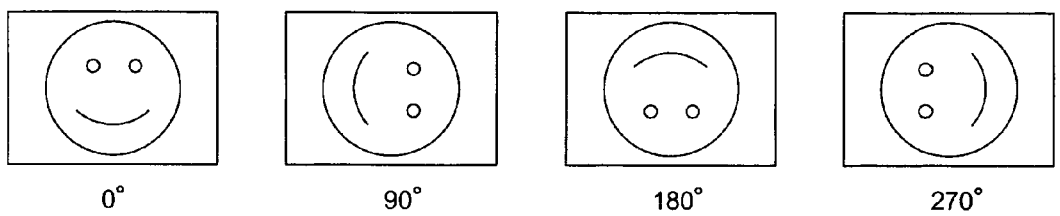
FIG. 1(a) 0°  FIG. 1(b) 90°  FIG. 1(c) 180°  FIG. 1(d) 270°
FIG. 2
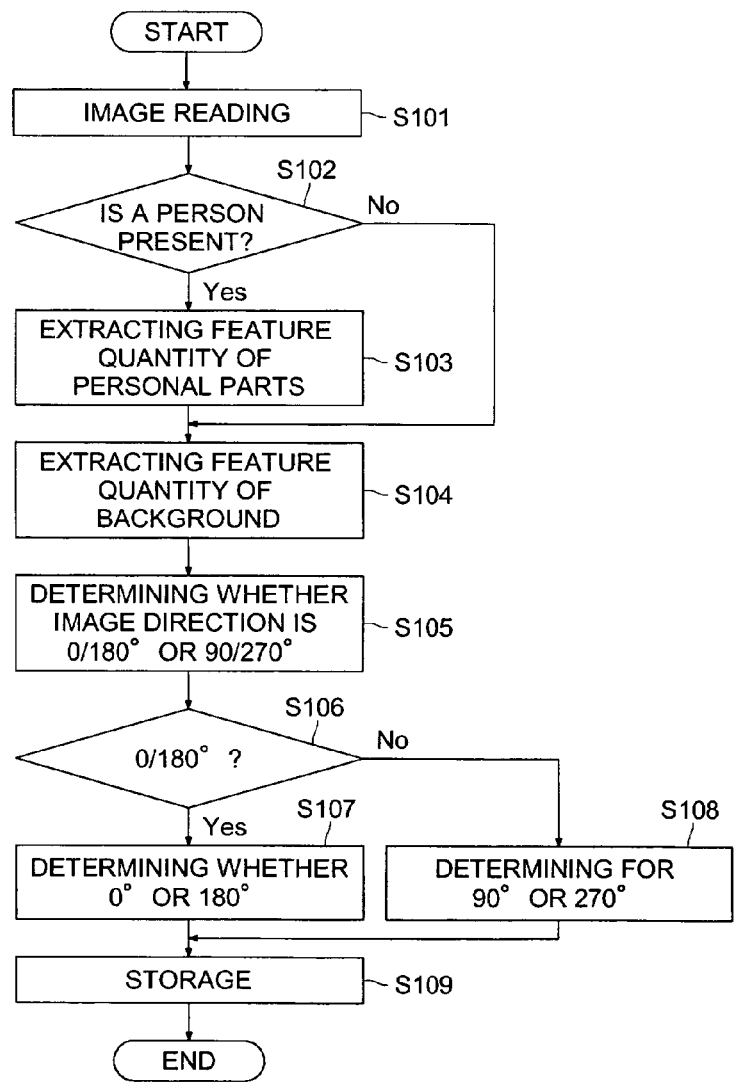

IMAGE PROCESSING METHOD, IMAGE PROCESSING APPARATUS, STORAGE MEDIUM AND PROGRAM

BACKGROUND OF THE INVENTION

The present invention relates to an image processing method, an image processing apparatus, a program for executing or operating the foregoing, and a storage medium in which the aforementioned program is stored.

With recent progress of processing technologies for digital image signals, there is available a service to store and preserve image signals taken from a silver halide film and a print by the use of a scanner, in a storage medium such as CD. In this service, if a user takes a silver halide film or a print on hand to a photo-finishing lab, the user can get CD or the like storing image signals corresponding to the images of the aforementioned silver halide film or print. Thus, the user does not need to pay attention to control for preservation of the silver halide film, and can appreciate images by using his or her personal computer according to circumstances, or to distribute copies, which is a merit.

Since the user takes a picture while holding a silver halide based camera horizontally or vertically depending on a photographic object posture, a direction of the image taken on a silver halide film varies in accordance with a horizontal position or vertical position. Therefore, if image signals taken from a silver halide film or a print by the use of a scanner are stored in CD or the like as they are, the longitudinal direction of the image agrees with the horizontal direction on a monitor, resulting in a problem that it is difficult to observe, when the image taken in the vertical position is displayed by a user on a monitor, for example. In this case, if an image processing software is installed in the personal computer, the image on the monitor can be rotated by using the software. However, if the image processing software is not installed, or if the user is not used to operations of the personal computer, the image cannot be rotated easily, which is a problem. In the aforementioned service, therefore, based on image signals taken from a silver halide film or a print by the use of a scanner, a worker judges each direction of the image from images displayed actually, and stores and preserves in a storage medium such as CD after conducting image processing so that longitudinal directions of all images may agree with a vertical direction on the monitor, for example. However, there is a demand for mechanizing these operations because it is time-consuming to conduct the operations for all images in a huge amount.

Similar problems are caused also in the case to store a series of image signals on a storage medium such as CD after photographing by the use of digital still cameras.

In the following Patent Document 1, there is disclosed a method wherein positional relations of parts of a face (eyes, mouth, hair or the like) in an image and positional relations of constituents (arms and legs) of a body are used to determine automatically the direction of the image. When this method is used, the direction of an image can be obtained at a certain probability.

[Patent Document 1]
TOKKAIHEI No. 8-138024

In the technology disclosed in Patent Document 1, however, there has been a problem that the oriented direction of the image cannot be determined, when a face is not included in an image. Further, even in the case where a face is included in an image, it is not always easy to recognize the face correctly as a face of a person, at this stage, and it is further difficult to obtain a positional relation for parts of the face. Therefore, owing to the incorrect recognitions of them, there has been a fear that the oriented direction of the image cannot be determined accurately.

SUMMARY OF THE INVENTION

To overcome the abovementioned drawbacks in conventional image-processing methods, apparatus and programs, it is an object of the present invention to provide image-processing method, apparatus and program, which make it possible to accurately determine the oriented direction of the image without requiring operator's assistances.

Accordingly, to overcome the cited shortcomings, the abovementioned object of the present invention can be attained by image-processing methods, apparatus and programs described as follow.

(1) A method for processing an image to be displayed as a single screen image, comprising the steps of: determining whether or not a personal image is included in the image, based on image signals representing the image; recognizing an oriented direction of the image, based on at least one of element-feature quantities with respect to constituent elements constituting the personal image, when determining that the personal image is included in the image in the determining step.

(2) The method of item 1, wherein the constituent elements include a shape of face, a positional relationship between both eyes, a positional relationship between the face and hair on a head, and a positional relationship between the face and a hand or a leg.

(3) The method of item 1, wherein, when determining that the personal image is included in the image in the determining step, the oriented direction of the image is recognized, based on a background-feature quantity obtained by comparing a feature quantity, extracted from an image area included in the image, with another feature quantity, extracted from another image area included in the image in addition to at least one of the element-feature quantities.

(4) The method of item 3, wherein, when recognizing the oriented direction of the image based on both the element-feature quantities and the background-feature quantity, a weighting for the element-feature quantities is heavier than that for the background-feature quantity.

(5) The method of item 3, wherein the image area and the other image area are located at peripheral regions of the image.

(6) The method of item 1, wherein, when not in the determining step, the oriented direction of the image is recognized, based on a background-feature quantity obtained by comparing a feature quantity, extracted from an image area included in the image, with another feature quantity, extracted from another image area included in the image.

(7) The method of item 6, wherein the background-feature quantity relates to one of an image symmetry using color information, an image symmetry using edge information, an inclination of brightness, and uniformity of a region close to each side of the image.

(8) The method of item 6, wherein, when determining that the personal image is included in the image in the determining step, the oriented direction of the image is recognized, based on the background-feature quantity in addition to at least one of the element-feature quantities.

(9) The method of item 8, wherein, when recognizing the oriented direction of the image based on both the element-feature quantities and the background-feature quantity, a weighting for the element-feature quantities is heavier than that for the background-feature quantity.

(10) The method of item 8, wherein the image area and the other image area are located at peripheral regions of the image.

(11) The method of item 6, when the oriented direction of the image, recognized in the recognizing step, is other than an inclination of zero degree, further comprising the steps of: converting the image signals representing the image to rotated image signals representing a rotated image, whose oriented direction coincides with the inclination of zero degree; reducing a size of the rotated image signals so as to generate reduced-rotated image signals representing a reduced-rotated image; storing both the rotated image signals and the reduced-rotated image signals into a storage medium.

(12) The method of item 1, when the oriented direction of the image, recognized in the recognizing step, is other than an inclination of zero degree, further comprising the steps of: converting the image signals representing the image to rotated image signals representing a rotated image, whose oriented direction coincides with the inclination of zero degree; reducing a size of the rotated image signals so as to generate reduced-rotated image signals representing a reduced-rotated image; storing both the rotated image signals and the reduced-rotated image signals into a storage medium.

(13) A method for processing an image to be displayed as a single screen image, the image being one of a plurality of images, which have partial images relating to each other among the plurality of images, comprising the steps of: determining whether or not a personal image is included in the partial images, based on image signals representing the partial images; acquiring element-feature quantities with respect to constituent elements constituting the personal image, when determining that the personal image is included in the partial images in the determining step; acquiring background-feature quantities by comparing feature quantities extracted from image areas included in the partial images with other feature quantities extracted from another image areas included in the partial images; and recognizing an oriented direction of the image, based on at least one of the element-feature quantities and/or at least one of the background-feature quantities.

(14) The method of item 13, wherein, when recognizing the oriented direction of the image, a weighting for the element-feature quantities and/or the background-feature quantities with respect to the image is heavier than that with respect to another image.

(15) The method of item 13, further comprising the step of: reducing a size of the plurality of images prior to the steps of acquiring the element-feature quantities and the background-feature quantities to recognize the oriented direction of the image.

(16) The method of item 13, when the oriented direction of the image, recognized in the recognizing step, is other than an inclination of zero degree, further comprising the steps of: converting image signals representing the image to rotated image signals representing a rotated image, whose oriented direction coincides with the inclination of zero degree; reducing a size of the rotated image signals so as to generate reduced-rotated image signals representing a reduced-rotated image; storing both the rotated image signals and the reduced-rotated image signals into a storage medium.

(17) An apparatus for processing an image to be displayed as a single screen image, comprising: a determining section to determine whether or not a personal image is included in the image, based on image signals representing the image; a recognizing section to recognize an oriented direction of the image, based on at least one of element-feature quantities with respect to constituent elements constituting the personal image, when the determining section determines that the personal image is included in the image.

(18) The apparatus of item 17, wherein, when the determining section determines that the personal image is not included in the image, the recognizing section recognizes the oriented direction of the image, based on a background-feature quantity obtained by comparing a feature quantity, extracted from an image area included in the image, with another feature quantity, extracted from another image area included in the image.

(19) A computer program for executing operations for processing an image to be displayed as a single screen image, comprising the functional steps of: determining whether or not a personal image is included in the image, based on image signals representing the image; recognizing an oriented direction of the image, based on at least one of element-feature quantities with respect to constituent elements constituting the personal image, when determining that the personal image is included in the image in the determining step.

(20) The computer program of item 19, wherein, when not in the determining step, the oriented direction of the image is recognized, based on a background-feature quantity obtained by comparing a feature quantity, extracted from an image area included in the image, with another feature quantity, extracted from another image area included in the image.

Further, to overcome the abovementioned problems, other image-processing methods, apparatus and programs embodied in the present invention, will be described as follow:

(21) An image-processing method, characterized in that, the image-processing method includes a step of judging whether or not a personal image is included in a single screen image, based on image signals corresponding to the single screen image, and a step of determining a direction of the image, based on element-feature quantities with respect to constituent elements constituting the personal image, in case of judging that the personal image is included in the single screen image and, in case of judging that the personal image is not included in the single screen image, the direction of the image is determined, based on a background-feature quantity obtained by comparing a feature quantity extracted from an image area included in the image represented by the image signals corresponding to the single screen image with another feature quantity extracted from another image area included in the image.

According to the invention described in item 21, it becomes possible to accurately determine the direction of the image, even if the personal image is not included in the single screen image. Incidentally, the item of "feature quantity extracted from an image area" denotes, for instance, color information (color-difference information), edge information, brightness information, etc., but is not limited to them.

(22) The image-processing method, described in item 21, characterized in that, in case of judging that the personal image is included in the image in the determining step, the direction of the image is determined, further based on the background-feature quantity in addition to the element-feature quantities.

According to the invention described in item 22, it becomes possible to further accurately determine the direction of the image.

(23) The image-processing method, described in item 22, characterized in that, in case of judging the direction of the single screen image based on the element-feature quantities and the background-feature quantity, a weighting for the element-feature quantities is heavier than that for the background-feature quantity.

According to the invention described in item 23, it becomes possible to further accurately determine the direction of the image.

(24) The image-processing method, described in anyone of items 21-23, characterized in that, the image area and the other image area are located at periphery of the single screen image.

According to the invention described in item 24, it becomes possible to further accurately determine the direction of the image.

(25) The image-processing method, described in anyone of items 21-24, characterized in that, in case that there are a plurality of image signals corresponding to the single screen image, and at least a part of them is related to each other, when determining the direction of the single screen image, the element-feature quantities and/or the background-feature quantity, extracted from the image signals corresponding to the other screen image relating to it, are employed.

According to the invention described in item 25, when a plurality of images, which directions would roughly coincide with each other, for instance, like images included in a roll of silver-halide film as a related example, it becomes possible to improve the efficiency of determining operations by determining the direction of each image while correlating the plurality images corresponding to it.

(26) The image-processing method, described in item 25, characterized in that, in case of employing the element-feature quantities and/or the background-feature quantity, extracted from the image signals corresponding to the other screen image relating to it, a weighting for the element-feature quantities and/or the background-feature quantity extracted from the image signals corresponding to a single screen image is heavier than that for the element-feature quantities and/or the background-feature quantity, extracted from the image signals corresponding to the other screen image.

According to the invention described in item 26, it becomes possible to further accurately determine the direction of the image.

(27) The image-processing method, described in anyone of items 21-26, characterized in that, the direction of the single screen image is determined by extracting the element-feature quantities and/or the background-feature quantity from an image acquired by reducing the single screen image.

According to the invention described in item 27, it becomes possible to shorten the processing time.

(28) The image-processing method, described in anyone of items 21-27, characterized in that, in case that the determined direction of the single screen image is other than zero degree, converted image signals, corresponding to an image acquired by rotating the single screen image at zero degree, and converted-reduced image signals, corresponding to an image acquired by rotating the single screen image at zero degree and by further reducing the single screen image, are stored in a storage medium.

According to the invention described in item 28, it becomes possible to make the image-processing method user-friendlier than ever.

(29) An image-processing apparatus, characterized in that, the image-processing apparatus performs the image-processing methods described in anyone of items 21-28.

(30) A program, characterized in that, the program makes a computer to execute the image-processing methods described in anyone of items 21-28.

(31) A storage medium, characterized in that, the storage medium stores the program described in item 30.

Incidentally, although the image-processing apparatus performing the aforementioned image-processing methods would be, for instance, a computer, the scope of the present invention is not limited to the computer. In other words, a digital still camera, a digital color copier, a digital lab system, etc. could be cited as the abovementioned image-processing apparatus.

BRIEF DESCRIPTION OF THE DRAWINGS

Other objects and advantages of the present invention will become apparent upon reading the following detailed description and upon reference to the drawings in which:

FIG. 1(a), FIG. 1(b), FIG. 1(c) and FIG. 1(d) show exemplified images inclined at various oriented directions, such as zero degree, 90 degree, 180 degree and 270 degree, respectively;

FIG. 2 is a diagram showing a processing flowchart for determining the oriented direction of the image;

DETAILED DESCRIPTION OF THE PREFERRED EMBODIMENT

Figure 11:
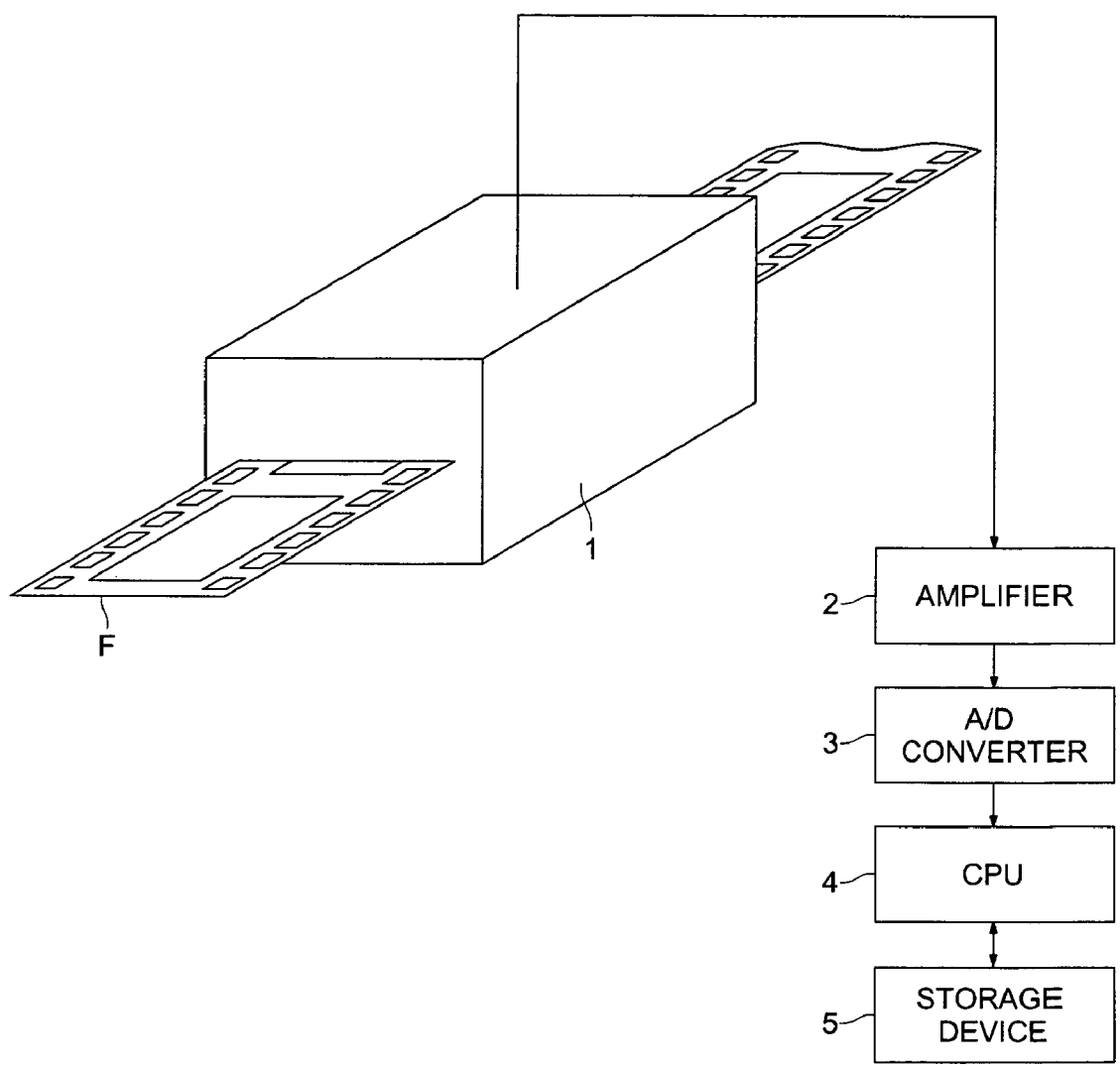
FIG. 11 is a schematic diagram showing an image processing apparatus that can carry out the image processing method relating to the embodiment of the invention.

Referring to the drawings, the embodiment of the invention will be detailed in the following. FIG. 11 is a schematic diagram showing an image processing apparatus that can carry out an image processing method relating to the present embodiment. In FIG. 11, film scanner 1 is equipped with an image pick-up element, and it reads images formed on silver halide film to converts them into electric signals. Electric signals outputted from the film scanner 1 are amplified by amplifier 2, then, are converted into digital image signals by A/D converter 3, and are subjected to image processing by CPU 4 to be stored in storage device 5. Incidentally, CPU 4 and storage device 5 may also be a personal computer.

Next, the image processing method of the present embodiment will be explained. In the present embodiment, CPU 4 determines the image direction out of 0°, 90°, 180° and 270°. Directions of images (personal faces) shown in FIG. 1(a)-FIG. 1(d) are assumed to be 0°, 90°, 180° and 270°. First, whether the image direction is of the case of 0° or 180° or the case of 90° or 270° is determined. Next, when determined to be the case of 0 or 180, the image direction is determined whether it is 0° or 180°, while when determined to be 90° or 270°, the image direction is determined whether it is 90° or 270°.

The determination of the image direction is composed of a step (step S 102 in FIG. 2) for determining whether a person is present in one image area as a photographic object or not, a step (step S 103 in FIG. 2) for extracting element-feature quantity relating to parts (which are also called elements) constituting the person when the person is present, a step (step S 104 in FIG. 2) for extracting background-feature quantity relating to a background other than the person and steps (steps S 106-S 108 in FIG. 2) for determining the image direction from feature quantities. Based on the processing flow for determining the image direction shown in FIG. 2, there will be shown each content of the processing.

First, CPU 4 reads image signals corresponding to an image area in step S 101 in FIG. 2, and then, determines, in step S 102, whether a person is present in the image area or not (whether a personal image is included or not). For this determination, there are suggested various methods, and in the present specification, the method described in TOK-KAIHEI No. 8-63597, for example, will be used, because it is possible to determine in that method.

In the method described in TOKKAIHEI No. 8-63597, prospective face areas each corresponding to a form of a personal face are decided and a face area is decided from feature quantities in the prospective face areas, in an extracting method for extracting a personal face from the image.

In another method, a prospective face area is detected by extracting a contour of a personal face from the image.

In still another method, a plurality of templates having various face forms are prepared, then, a degree of matching between the template and the image is calculated, and a template having the highest degree of matching is selected, thus, an area in the selected template is made to be a prospective face area if the highest degree of matching is not less than the threshold value established in advance.

In the aforementioned method, prospective face areas each corresponding to a form of a personal face are decided, and a face area is decided from feature quantities in the prospective face areas, and thereby, a personal face is extracted from color original images.

When a person is determined to be present in an image, in step S 102, CPU 4 extracts, in step S 103, and of element features relating to parts of a person (eyes, nose, mouth, ears, hairs and arms and legs). As an example of element-feature quantities necessary for determining the image direction, there are considered a feature quantity relating to a form of a face, a feature quantity relating to positional relation of both eyes, a feature quantity relating to positional relation between a face and hairs and a feature quantity based on positional relation between a face and arms or between a face and legs. How to obtain each of the foregoing will be explained as follows.

(a) Element-feature Quantity EFa Relating to a Form of a Face

First, an aspect ratio (height/width of a rectangle) of a rectangle that is circumscribed with a face is obtained by extracting a face area by the method described in TOK-KAIHEI No. 8-63597, and a value obtained by subtracting this aspect ratio from 1 is made to be feature quantities. When this value is positive, there is a high possibility that the image direction is 0/180°. If this value is negative, there is a high possibility that the image direction is 90/270°. When this value is close to zero, it is found that it is difficult to determine with this feature quantity. It is therefore recommended that the value is made to be zero or the value is weighted. When the face area is not extracted, this element-feature quantity is made to be zero.

Element-feature quantity EF$a$ relating to a form of face=1−aspect ratio (b) Element-feature Quantity EFb Relating to Positional Relation Between Both Eyes In this case, an angle of an image is obtained based on positions of both eyes to acquire element-feature quantity.

1. An eye area is extracted. The method described in TOKKAIHEI No. 8-63597 is used as an extracting method. When both eyes are not detected in this case, its element-feature quantity is made to be zero.

2. When both eyes are detected, a straight line that passes through centers of both eye areas from the center of the face area is drawn, and thereby, angle θ formed by this straight line and a horizontal direction of the image is obtained.

Element-feature quantity EFb relating to positional relation for both eyes is obtained based on the angle θ in the following manner. When its value is positive and greater, there is a high possibility that the image direction is 0/180°. Further, when its value is negative and greater, there is a high possibility that the image direction is 90/270°.

Element-feature quantity EF$b$ relating to positional relation of both eyes=θ−45 for $0 \leq \theta < 90°$ Element-feature quantity EF$b$ relating to positional relation of both eyes=135−θ for $90 \leq \theta < 180°$ Element-feature quantity EF$b$ relating to positional relation of both eyes=θ−225 for $180 \leq \theta < 270°$ Element-feature quantity EF$b$ relating to positional relation of both eyes=315−θ for $270 \leq \theta < 360°$ (c) Element-feature Quantity EFc Relating to Positional Relation Between a Face and Hairs An angle of an image is obtained based on positional relation between a face and hairs to acquire an element-feature quantity.

1. A hair area and a face area are extracted. The method described in TOKKAIHEI No. 8-635971 is used as an extracting method. When both the hair area and the face area are not detected in this case, its element-feature quantity is made to be zero.

2. When the hair area and the face area are extracted, angle θ formed by a straight line passing through the center of the face area and the center of the hair area and by a horizontal direction is obtained. Then, an element-feature quantity relating to positional relation between a face and hairs is obtained in the following manner. When its value is positive and greater, there is a high possibility that the image direction is 0/180°. Further, when its value is negative and greater, there is a high possibility that the image direction is 90/270°.

Element-feature quantity EFc relating to positional relation of a face and hairs=θ−45 for 0≦θ<90°

Element-feature quantity EFc relating to positional relation of a face and hairs=0−135 for 90≦θ<180°

Element-feature quantity EFc relating to positional relation of a face and hairs=θ−225 for 180≦θ<270°

Element-feature quantity EFc relating to positional relation of a face and hairs=θ−315 for 270≦θ<360°

(d) Element-feature Quantity EFd Relating to Positional Relation Between a Face and Arms or Between a Face and Legs An angle of an image is obtained based on positional relation between a face and arms or between a face and legs to acquire an element-feature quantity.

1. A face area and an arm area or a leg area are extracted. The method described in TOKKAIHEI No. 8-138024 is used as an extracting method. When the face area and the arm area or the leg area are not detected in this case, its element-feature quantity is made to be zero.

2. When the face area and the arm area or the leg area are detected, angle θ formed by a straight line passing through the center of the arm area or the leg area and the center of the face area and by a horizontal direction is obtained. Then, an element-feature quantity relating to positional relation between a face and arms or legs is obtained in the following manner. When its value is positive and greater, there is a high possibility that the image direction is 0/180°. Further, when its value is negative and greater, there is a high possibility that the image direction is 90/270°.

Element-feature quantity EFd based on positional relation of a face and arms or legs=θ−45 for 0≦θ<90°

Element-feature quantity EFd relating to positional relation of a face and arms or legs=0−135 for 90≦θ<180°

Element-feature quantity EFd based on positional relation of a face and arms or legs=θ−225 for 180≦θ<270°

Element-feature quantity EFd based on positional relation of a face and arms or legs=θ−315 for 270≦θ<360°, Then, CPU 4 obtains background-feature quantity in step S 104. Incidentally, when it is determined that a person is not present, in step S 102, CPU 4 does not execute step 103 but obtains a background-feature quantity in step S 104.

Background-feature Quantity Relating to Photographic Object (Background) Other than a Person As an example of a feature quantity relating to the total image composition (though a terminology of background is used, a person may also be included), there are given symmetry, gradient of brightness and uniformity of an area touching each side. How to obtain each of the foregoing will be explained as follows.

(a) Background-feature Quantity Relating to Symmetry

Figure 3:
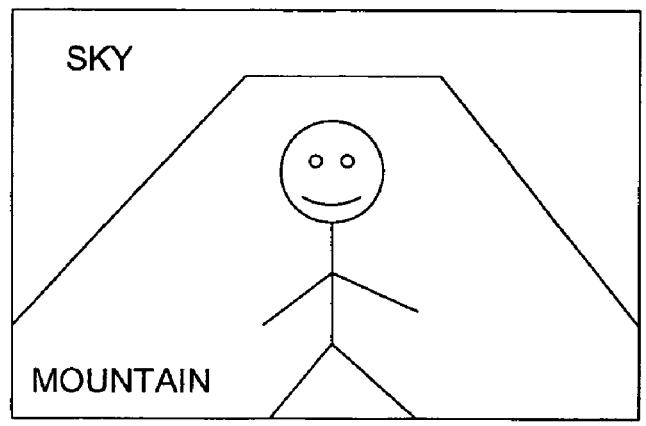
FIG. 3 is an example of images in an image area.

On the occasion of photographing in the open air, images with composition shown in FIG. 3 are obtained in many cases. In the image of this kind, symmetry for the right and left is higher than that for the upper and lower sides. It is therefore possible to determine the image direction by using a background-feature quantity showing this symmetry. Further, even in the case of indoor photographing, images each having composition wherein a background is a wall and a person is present at the center are obtained in many cases too, and in such a case, the image direction can be determined by the same method as in the foregoing.

Figure 4:
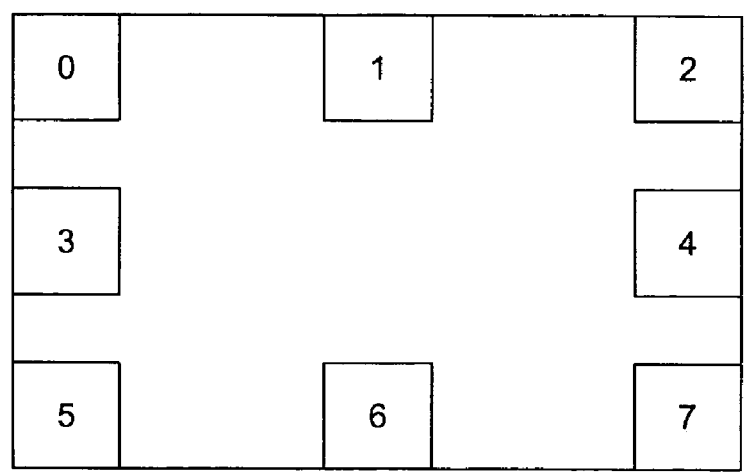
FIG. 4 is a diagram showing schematically an image area.

(I) Background-feature Quantity BFa Relating to Symmetry Utilizing Color Information 1. The mean value of color information (for example, $L^*u^*v^*$) in peripheral eight areas (abbreviated as upper left, mid left, lower left, mid upper, mid lower, upper right, mid right and lower right) of the image area in FIG. 4 showing an image area schematically. Incidentally, though $L^*u^*v^*$ is used for color information, and color difference is used to express a difference of color, it is also possible that the color information is $L^*a^*b^*$, HSV or HIQ, for example, without being limited to the foregoing, and the color information is a gauge expressing a difference of color corresponding to the $L^*a^*b^*$, HSV or HIQ.

2. Symmetry of an image in the horizontal direction is obtained based on color information. Specifically, a color difference between an upper left area and an upper right area, that between a mid left area and a mid right area and that between a lower left are and a lower right area are calculated, and the mean value aveh (color) for them is obtained. Incidentally, although the mean value is used in this case, it is also possible to use a maximum value, a minimum value or dispersion.

Color difference between upper left and upper right= $(L^*(\text{upper left})-L^*(\text{upper right}))^2+(u^*(\text{upper left})-u^*(\text{upper right}))^2+(v^*(\text{upper left})-v^*(\text{upper right}))^2$ Color difference between mid left and mid right=$(L^*(\text{mid left})-L^*(\text{mid right}))^2+(u^*(\text{mid left})-u^*(\text{mid right}))^2+(v^*(\text{mid left})-v^*(\text{mid right}))^2$ Color difference between lower left and lower right= $(L^*(\text{lower left})-L^*(\text{lower right}))^2+(u^*(\text{lower left})-u^*(\text{lower right}))^2+(v^*(\text{lower left})-v^*(\text{lower right}))^2$ aveh (color)=(color difference between upper left and upper right+color difference between mid left and mid right+color difference between lower left and lower right)/3

Incidentally, $L^*$(upper left), for example, is assumed to mean $L^*$ value of an upper left area.

3. Symmetry in the vertical direction is obtained based on color information. Specifically, a color difference between an upper left area and a lower left area, that between a mid upper area and a mid lower area and that between an upper right are and a lower right area are obtained.

Color difference between upper left and lower left= $(L^*(\text{upper left})-L^*(\text{lower left}))^2+(u^*(\text{upper left})-u^*(\text{lower left}))^2+(v^*(\text{upper left})-v^*(\text{lower left}))^2$ Color difference between mid upper and mid lower=
$(L^*(\text{mid upper})-L^*(\text{mid lower}))^2+(u^*(\text{mid upper})-u^*(\text{mid lower}))^2+(v^*(\text{mid upper})v^*(\text{mid lower}))^2$ Color difference between upper right and lower right=$(L^*(\text{upper right})-L^*(\text{lower right}))^2+(u^*(\text{upper right})-u^*(\text{lower right}))^2+(v^*(\text{upper right})-v^*(\text{lower right}))^2$ Ave$v$ (color)=(color difference between upper left and lower left+color difference between mid upper and mid lower+color difference between upper right and lower right)/3

4. A difference between aveh (color) and avev (color) is made to be background-feature quantity BFa relating to symmetry utilizing color information (see the following expression).

Background-feature quantity BF$a$ relating to symmetry utilizing color information=ave$v$ (color)−ave$h$ (color)

When this value is negative and greater, there is a high possibility that the image direction is 90/270°. Further, when this value is closer to zero, there is shown that this feature quantity makes it difficult to determine.

Figure 5:
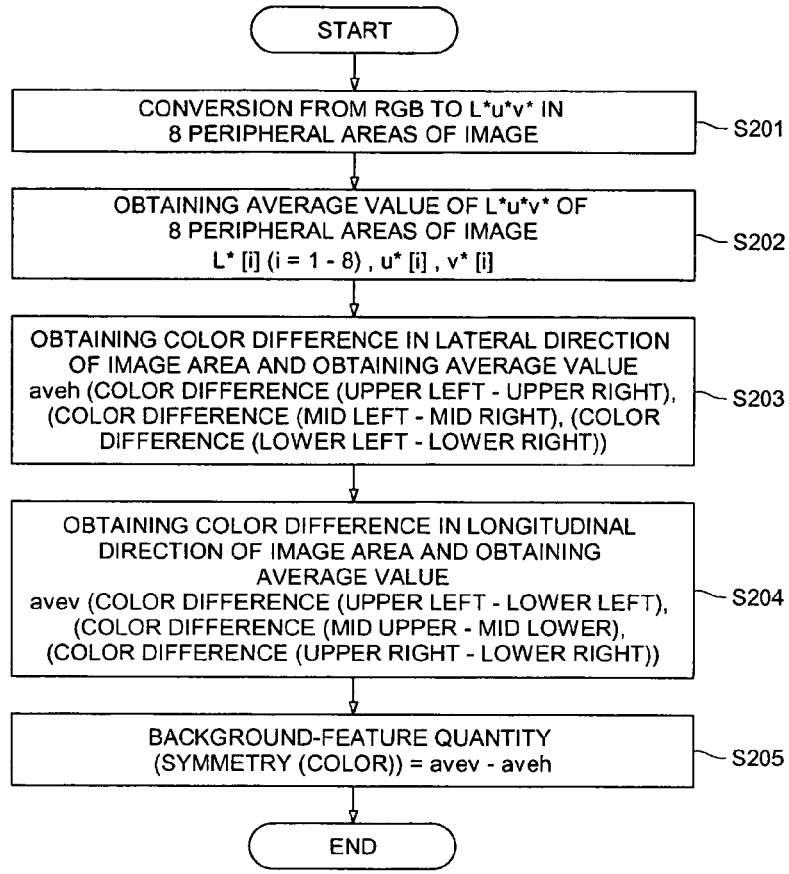
FIG. 5 is a diagram showing a processing flowchart for obtaining background-feature quantity relating to symmetry wherein color information is used.

FIG. 5 shows a specific processing flow for performing the aforementioned processing by using CPU 4. In step S 201 in FIG. 5, CPU 4 converts RGB data in 8 peripheral areas of the image into L*u*v* data. Further, in Step S 202, CPU 4 obtains the mean value of L*u*v* data in 8 peripheral areas of the image. Then, in step S 203, CPU 4 obtains a color difference of the image in the lateral direction based on the mean value of the L*u*v* data, and conducts operation for the horizontal mean value (=aveh). In step S 204, CPU 4 further obtains a color difference in the longitudinal direction of the image based on the mean value of the L*u*v* data, and conducts operation for its vertical mean value (=avev). Finally, in step S 205, CPU 4 obtains background-feature quantity BFa based on the horizontal mean value and the vertical mean value.

(II) Background-feature Quantity BFb Relating to Symmetry Utilizing Edge Information The same method as that in the foregoing can be used with an exception that edge information is used in place of color information. With respect to the edge information, peripheral pixels on four vicinities of symmetrical pixels and an absolute value of BGR differences are obtained, in the present example, and these are added up to obtain a value that is calculated as an edge amount. Incidentally, in addition to the foregoing, the values obtained under application of Laplacian filter or Sobel filter may also be used.

Ave$h$ (edge)=(difference of edge amount between upper left and upper right+difference of edge amount between mid left and mid right+difference of edge amount between lower left and lower right)/3 is obtained. 1.

Ave$v$ (edge)=(difference of edge amount between upper left and lower left+difference of edge amount between mid upper and mid lower+difference of edge amount between lower left and lower right/3 is obtained. 2.

Background-feature quantity BF$b$ relating to symmetry utilizing edge information=|ave$v$ (edge)|−|ave$h$ (edge)| is obtained. 3.

When this value is a positive number and is greater, there is a high possibility that the image direction is 0/180°. When this value is a negative number and is greater, there is a high possibility that the image direction is 90/270°. Further, when this value is closer to zero, there is shown that this feature quantity makes it difficult to determine.

(III) Background-feature Quantity BFc Relating to Gradient of Brightness

Figure 7:
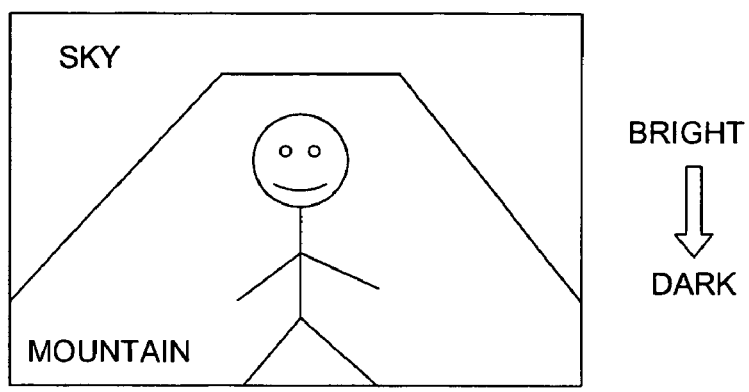
FIG. 7 is an example of images in an image area.

Even in the outdoor scene shown in FIG. 7 or in the indoor scene, there are many cases where gradient of brightness in the vertical direction is caused by an effect of a light source such as the sun or an indoor lamp. In other words, there is a tendency that brightness is enhanced at the upper portion of the image and is lowered at the lower portion of the image. When this tendency is made to be a background-feature quantity, the image direction can be determined.

1. Luminance differences for luminance of upper left–luminance of upper right, for luminance of mid left–luminance of mid right and for luminance of lower left–luminance of lower right are calculated, and its mean value aveh (luminance) is obtained. For luminance, either L* value or R+G+B value can be used.

2. Luminance differences for luminance of upper left–luminance of lower left, for luminance of mid upper–luminance of mid lower and for luminance of upper right–luminance of lower right are calculated, and its mean value avev (luminance) is obtained.

3. A difference between an absolute value of aveh (luminance) and an absolute value of avev (luminance) is obtained as a background-feature quantity relating to the gradient of brightness (see the following expression).

Background-feature quantity BF$c$ relating to gradient of brightness=|ave$v$ (luminance)|−|ave$h$ (luminance)|

When this value is a positive number and is greater, there is a high possibility that the image direction is 0/180°. When this value is a negative number and is greater, there is a high possibility that the image direction is 90/270°.

Figure 6:
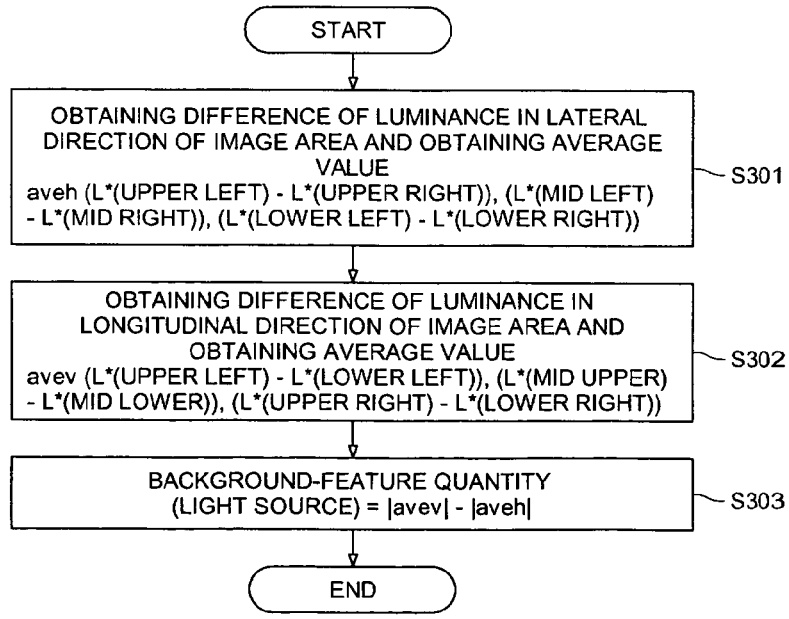
FIG. 6 is a diagram showing a processing flowchart for obtaining background-feature quantity relating to inclination of brightness.

FIG. 6 shows a specific processing flow for performing the aforementioned processing by using CPU 4. In step S 301 in FIG. 6, CPU 4 obtains a luminance difference in the lateral direction of an image area, and conducts operation for the horizontal mean value (luminance). In step S 302, CPU 4 obtains a luminance difference in the longitudinal direction of an image area, and conducts operation for the vertical mean value (luminance). Finally in step S 303, CPU 4 obtains a background-feature quantity relating to gradient of brightness, based on the horizontal mean value (luminance) and the vertical mean value (luminance).

Figure 8:
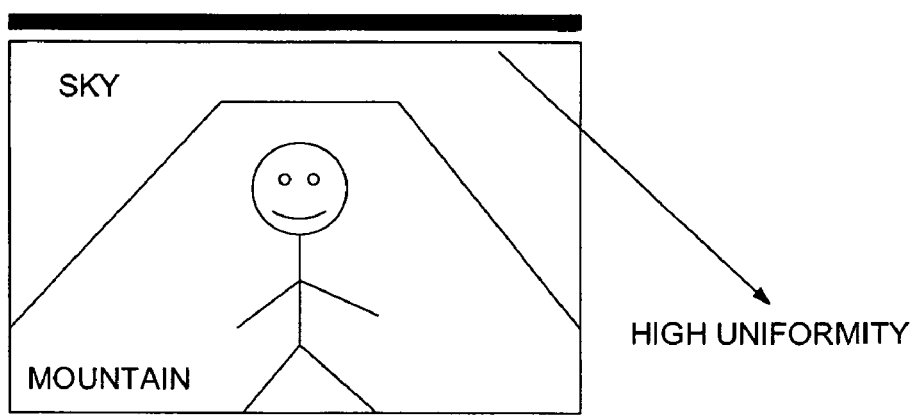
FIG. 8 is an example of images in an image area.

(IV) Background-feature Quantity BFd Relating to Uniformity of Areas Each Touching Each Side of an Image Area In either case of an outdoor scene and an indoor scene, there are many cases where the sky, a wall or the ceiling is present in an upper portion of an image, and the ground or a floor is present in a lower portion of an image. By making this tendency to be a feature quantity, the image direction can be determined. Specifically, in the composition shown in FIG. 8, for example, uniformity of color information or of edge information is high, because an upper side of the image is in contact totally with the sky.

1. Uniformity of a color is obtained along each of peripheral four sides. In this case, standard deviations of L*, u*, and v* are obtained, and these are weighted and added up to acquire the numerical value that shows color uniformity, although there are many methods of obtaining the color uniformity. As described in TOKKAIHEI No. 9-284429 as an example of weighting, the uniformity is obtained by the following expression.

Uniformity=(standard deviation of $L^*$)+0.852×(standard deviation of $u^*$)+0.323×(standard deviation of $v^*$)

2. As a background-feature quantity relating to uniformity of areas each touching each side of the image area, there is obtained a difference between a value of uniformity that is smaller among uniformity on a left side and that on a right side and a value of uniformity that is smaller among uniformity on an upper side and that on a lower side (see the following expression).

Background-feature quantity BF$d$ relating to uniformity of areas each touching each side of an image area=min (uniformity (left side), uniformity (right side))−min (uniformity (upper side), uniformity (lower side))

When this value is a positive number and is greater, there is a high possibility that the image direction is 0/180°. When this value is a negative number and is greater, there is a high possibility that the image direction is 90/270°.

Figure 9:
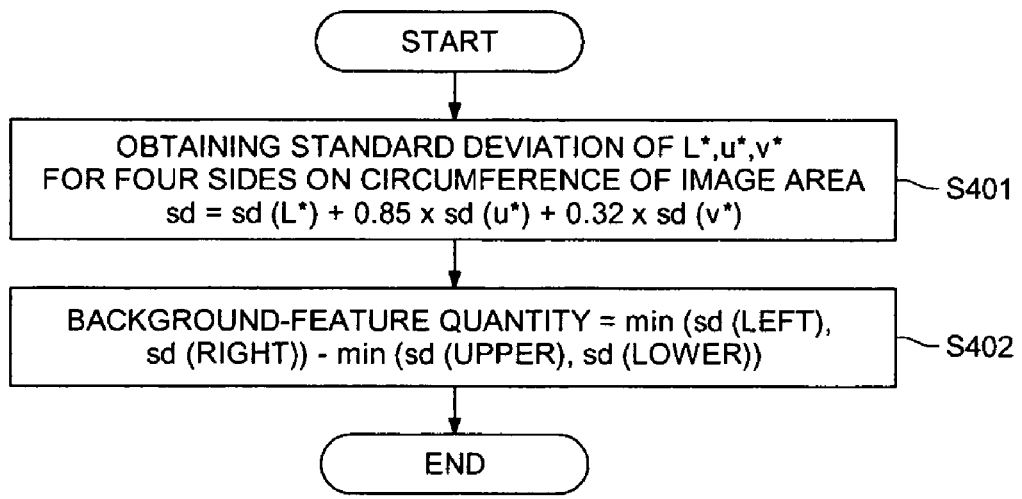
FIG. 9 is a diagram showing a processing flowchart for obtaining background-feature quantity relating to uniformity of areas each adjoining each side of the image area.
Figure 10:
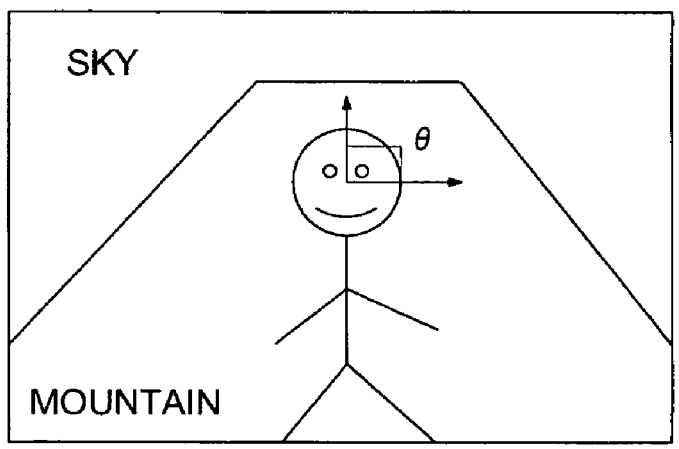
FIG. 10 is an example of images in an image area.

FIG. 9 shows a specific processing flow for performing the aforementioned processing by using CPU 4. In step S 401 in FIG. 9, CPU 4 obtains a standard deviation of L*, u*, and v* along peripheral four sides of the image area (sd represents a standard deviation in the expression in the drawing). In the succeeding step S 402, CPU 4 obtains a background-feature quantity relating to uniformity of areas each touching each side of an image area.

After obtaining the background-feature quantity in the aforesaid manner, CPU 4 determines, in step S 105 in FIG. 2, whether or not the image direction is 0° or 180°. In this case, a determining method varies depending upon the result of determination whether or not a personal image is present in one image. When a personal image is determined to be present, an element-feature quantity and a background-feature quantity are used for making determination. In this case, an element-feature quantity relating to parts of a person is weighted greatly. When a personal image is determined not to be present, a background-feature quantity only is used for making determination. An example of a specific method will be shown.

(When a Personal Image is Determined to be Present)

Each element-feature quantity and each background-feature quantity are weighted respectively and are summed up to acquire a value which is used for determining. Specifically, calculation of the following expression is conducted.

Evaluation gauge (with a face)=$W1·EFa+W2·EFb+W3·EFc+W4·EFd+W5·BFa+W6·BFb+W7·BFc+W8·BFd$ (1)

In the aforesaid expression, each of W1-W8 is a weighting coefficient for each feature quantity.

With regard to determination of the image direction, when a personal image is included in one image, it is preferable to establish weighting of an element feature quantity relating to parts of a person (W1, W2, W3 and W4) to be greater than weighting of a background-feature quantity (W5, W6, W7 and W8).

Based on the value of the evaluation gauge, the image direction is determined whether it is 0° or 180° or is 90° or 270°. In addition to this, it is also possible to determine by using a neural net. In that case, the feature quantity stated above is inputted in an input layer of the neural net for determination.

(When a Personal Image is Determined Not to be Present)

In this case, the image direction is determined by using only a background-feature quantity relating to the total composition of the image. In this case, each of W1-W4 is zero, and therefore, calculation of the following expression is conducted, to determine the image direction based on the calculated value.

Evaluation gauge (without a face)=$W5·BFa+W6·BFb+W7·BFc+W8·BFd$ (2)

In the same way as in the occasion when a personal image is determined to be present, a method to determine by using a neural net may also be used.

In step S 107 in FIG. 2, CPU 4 determines whether the image direction is 0° or 180°. For example, when a negative film is digitized by a film scanner, there is sometimes an occasion where the image direction is rotated by 180° at every roll of negative film (hereinafter referred to as a lot). In this case, a trend of plural image directions in the same lot is utilized without determining by a single image alone. In this case, it is possible to determine the image direction by using the element-feature quantity relating to parts of a person mentioned above and a background-feature quantity. Specific examples will be shown below.

(Example Utilizing Background-feature Quantity)

1. There is utilized avev (luminance) obtained by calculation when obtaining background-feature quantity BFc relating to gradient of brightness. A mean value is obtained from values of avev (luminance) in the same lot, and when this mean value is positive, the directions of all images in the same lot are determined to be 0°, while, if the mean value is negative, the directions of all images in the same lot are determined to be 180°.

2. From the mean value of L*, u* and v* touching each side that is calculated when obtaining background-feature quantity BFd relating to uniformity of areas each touching each side of an image area, the aforesaid side is determined to be in the upper portion of the image when the mean value shows a color of the sky. When the mean value shows a color of the ground, the aforesaid side is determined to be in the lower portion of the image. Incidentally, when a personal image is determined to be present in one image area, the image direction can be determined from the element-feature quantity in the following way.

(Example Utilizing Element-feature Quantity)

1. When θ obtained by calculation in obtaining element-feature quantity EFb relating to positional relation between both eyes is in a range of 45°≦θ<135°, the image direction is determined to be 0°, while when θ is in a range of 225°≦θ<315°, the image direction is determined to be 180°.

2. When θ obtained by calculation in obtaining element-feature quantity EFc relating to positional relation between a face and hairs is in a range of 45°≦θ<135°, the image direction is determined to be 0°, while when θ is in a range of 225°≦θ<315°, the image direction is determined to be 180°.

It is possible to execute either one of the aforesaid determining methods, or to execute the determining methods in combination. It is preferable to execute either one method when processing speed is required, and to execute some methods in combination when probability is required. In that case, when a personal image is present in one image area, it is preferable to weight the element-feature quantity relating to positional relation of parts of a person greatly as described above.

On the other hand, CPU 4 determines whether the image direction is 90° or 270°, in step S 108 in FIG. 2. The specific example for this will be shown below.

(Example Utilizing Background-feature Quantity)

1. There is utilized aveh (luminance) obtained by calculation when obtaining background-feature quantity BFc relating to gradient of brightness. When this value is positive, the image direction is determined to be 270°, while, if the value is negative, the image direction is determined to be 90°.

2. From the mean value of L*, u* and v* touching each side that is calculated when obtaining background-feature quantity BFd relating to uniformity of areas each touching each side of an image area, the aforesaid side is determined to be in the upper portion of the image when the mean value shows a color of the sky. When the mean value shows a color of the ground, the aforesaid side is determined to be in the lower portion of the image. Incidentally, when a personal image is determined to be present in one image area, the image direction can be determined from the element-feature quantity in the following way.

(Example Utilizing Element-feature Quantity)

1. When θ obtained by calculation in obtaining element-feature quantity EFb relating to positional relation between both eyes is in a range of −45°≦θ<45°, the image direction is determined to be 90°, while when θ is in a range of 135°≦θ<225°, the image direction is determined to be 270°.

2. When θ obtained by calculation in obtaining element-feature quantity EFc relating to positional relation between a face and hairs is in a range of −45°≦θ<45°, the image direction is determined to be 90°, while when θ is in a range of 135°≦θ<225°, the image direction is determined to be 270°.

It is possible to execute either one of the aforesaid determining methods, or to execute the determining methods in combination. It is preferable to execute either one method when processing speed is required, and to execute some methods in combination when probability is required. In that case, when a personal image is present in one image area, it is preferable to weight the element-feature quantity relating to positional relation of parts of a person greatly as described above.

In the same lot, a photographer is the same person in many cases, and with regard to 90° or 270°, therefore, the trend is biased to either one of them in many cases. AS a method to utilize this trend, when there are three image sheets determined to be 90° or 270° in the lot, and two among them are determined to be 90°, for example, it is possible to adjust the evaluation gauge so that the probability for the third sheet to be 90° may be high. In the present embodiment, when a face is not included in one image area, or even when eyes and hairs are not extracted accurately even if a face is present, it is possible to determine the image direction accurately by using the aforementioned method. In this case, it is possible to determine by using an evaluation gauge for images preceding and succeeding the object images for determination, in addition to the evaluation gauges (expressions (1) and (2)) for the object images for determination, and in this case, it is preferable that weighting for the evaluation gauge for the object images for determination is greater than that for the evaluation gauge for images preceding and succeeding the object images for determination.

Incidentally, the aforementioned processing can be carried out on a reduced image of the original image (for example, images of raw data taken from a scanner). Images with high resolution are not needed for determining the image direction, and it is possible to determine the image direction accurately for the image having about ¼ of VGA (Video Graphics Array) (320×240 pixels). In the case of the image that is greater than the foregoing, a thinned-out image is prepared, and the aforesaid processing is performed on the thinned-out image. By doing this, the processing speed can be improved without lowering a precision.

Determination of the image direction by the method stated above is conducted by an inputting equipment such as a digital camera or a film scanner, and when the image needs to be rotated (occasion other than 0°), it is also possible to rotate the original image and to prepare further its reduced image to store and preserve it in a prescribed recording medium separately from the original image. In this case, it is preferable that a digital camera or a film scanner is provided with a function to confirm a user whether the original image needs to be preserved or not.

Further, when an image format is Exif, the image direction may be written on a prescribed place in a header as metadata showing attribute of the image, in place of preparing the image which is rotated in terms of direction from the original image. As a result of the foregoing, the image direction is determined in inputting equipment, and when the image needs to be rotated, the rotated image is preserved, thus, an erect image is displayed when an image is indicated, which gives a user an effect that the image can be observed easily. A program for executing an image processing method relating to determination of the image direction by the aforesaid method is stored in a storage medium such as CD or a hard disc, and can be executed by a personal computer.

The invention has been explained above, referring to the embodiment to which, however, the invention is not limited, and the invention can naturally be modified and improved according to circumstances.

The invention makes it possible to provide an image processing method wherein the image direction can be determined accurately without relying on a person's help, an image processing apparatus, a program for executing or operating the foregoing, and a storage medium in which the aforementioned program is stored.

Disclosed embodiment can be varied by a skilled person without departing from the spirit and scope of the invention.

What is claimed is:

1. A method for processing an image to be displayed as a single screen image, comprising:
   determining whether or not a personal image is included in said image, based on image signals representing said image; and
   recognizing an oriented direction of said image, based on at least one of element-feature quantities with respect to constituent elements constituting said personal image, when determining that said personal image is included in said image in said determining step;
   wherein, when determining that said personal image is included in said image in said determining step, said oriented direction of said image is recognized, based on a background-feature quantity obtained by comparing a feature quantity, extracted from an image area included in said image, with another feature quantity, extracted from another image area included in said image in addition to at least one of said element-feature quantities.

2. The method of claim 1,
   wherein said constituent elements include a shape of face, a positional relationship between both eyes, a positional relationship between said face and hair on a head, and a positional relationship between said face and a hand or a leg.

3. The method of claim 1,
wherein, when recognizing said oriented direction of said image based on both said element-feature quantities and said background-feature quantity, a weighting for said element-feature quantities is heavier than that for said background-feature quantity.

4. The method of claim 1,
wherein said image area and said other image area are located at peripheral regions of said image.

5. A method for processing an image to be displayed as a single screen image, comprising:
determining whether or not a personal image is included in said image, based on image signals representing said image; and
recognizing an oriented direction of said image, based on at least one of element-feature quantities with respect to constituent elements constituting said personal image, when determining that said personal image is included in said image in said determining step;
wherein, when not in said determining step, said oriented direction of said image is recognized, based on a background-feature quantity obtained by comparing a feature quantity, extracted from an image area included in said image, with another feature quantity, extracted from another image area included in said image.

6. The method of claim 5,
wherein said background-feature quantity relates to one of an image symmetry using color information, an image symmetry using edge information, an inclination of brightness, and uniformity of a region close to each side of said image.

7. The method of claim 5,
wherein, when determining that said personal image is included in said image in said determining step, said oriented direction of said image is recognized, based on said background-feature quantity in addition to at least one of said element-feature quantities.

8. The method of claim 7,
wherein, when recognizing said oriented direction of said image based on both said element-feature quantities and said background-feature quantity, a weighting for said element-feature quantities is heavier than that for said background-feature quantity.

9. The method of claim 7,
wherein said image area and said other image area are located at peripheral regions of said image.

10. The method of claim 5, when said oriented direction of said image, recognized in said recognizing step, is other than an inclination of zero degree, further comprising the steps of:
converting said image signals representing said image to rotated image signals representing a rotated image, whose oriented direction coincides with said inclination of zero degree;
reducing a size of said rotated image signals so as to generate reduced-rotated image signals representing a reduced-rotated image;
storing both said rotated image signals and said reduced-rotated image signals into a storage medium.

11. A method for processing an image to be displayed as a single screen image, comprising:
determining whether or not a personal image is included in said image, based on image signals representing said image; and
recognizing an oriented direction of said image, based on at least one of element-feature quantities with respect to constituent elements constituting said personal image, when determining that said personal image is included in said image in said determining step; and
when said oriented direction of said image, recognized in said recognizing step, is other than an inclination of zero degree, the method further comprising the steps of:
converting said image signals representing said image to rotated image signals representing a rotated image, whose oriented direction coincides with said inclination of zero degree;
reducing a size of said rotated image signals so as to generate reduced-rotated image signals representing a reduced-rotated image; and
storing both said rotated image signals and said reduced-rotated image signals into a storage medium.

12. A method for processing an image to be displayed as a single screen image, said image being one of a plurality of images, which have partial images relating to each other among said plurality of images, comprising the steps of:
determining whether or not a personal image is included in said partial images, based on image signals representing said partial images;
acquiring element-feature quantities with respect to constituent elements constituting said personal image, when determining that said personal image is included in said partial images in said determining step;
acquiring background-feature quantities by comparing feature quantities extracted from image areas included in said partial images with other feature quantities extracted from another image areas included in said partial images; and
recognizing an oriented direction of said image, based on at least one of said element-feature quantities and/or at least one of said background-feature quantities.

13. The method of claim 12,
wherein, when recognizing said oriented direction of said image, a weighting for said element-feature quantities and/or said background-feature quantities with respect to said image is heavier than that with respect to another image.

14. The method of claim 12, further comprising the step of:
reducing a size of said plurality of images prior to said steps of acquiring said element-feature quantities and said background-feature quantities to recognize said oriented direction of said image.

15. The method of claim 12, when said oriented direction of said image, recognized in said recognizing step, is other than an inclination of zero degree, further comprising the steps of:
converting image signals representing said image to rotated image signals representing a rotated image, whose oriented direction coincides with said inclination of zero degree;
reducing a size of said rotated image signals so as to generate reduced-rotated image signals representing a reduced-rotated image;
storing both said rotated image signals and said reduced-rotated image signals into a storage medium.

16. An apparatus for processing an image to be displayed as a single screen image, comprising:
a determining section to determine whether or not a personal image is included in said image, based on image signals representing said image; and a recognizing section to recognize an oriented direction of said image, based on at least one of element-feature quantities with respect to constituent elements constituting said personal image, when said determining section determines that said personal image is included in said image;

wherein, when said determining section determines that said personal image is not included in said image, said recognizing section recognizes said oriented direction of said image, based on a background-feature quantity obtained by comparing a feature quantity, extracted from an image area included in said image, with another feature quantity, extracted from another image area included in said image.

17. A computer readable medium encoded with a computer program for processing an image to be displayed as a single screen image, performing the steps of:

determining whether or not a personal image is included in said image, based on image signals representing said image;

recognizing an oriented direction of said image, based on at least one of element-feature quantities with respect to constituent elements constituting said personal image, when determining that said personal image is included in said image in said determining step;

wherein, when not in said determining step, said oriented direction of said image is recognized, based on a background-feature quantity obtained by comparing a feature quantity, extracted from an image area included in said image, with another feature quantity, extracted from another image area included in said image.

* * * * *